United States Patent [19]
Wang

[11] 3,890,578
[45] June 17, 1975

[54] DYE LASER EXCITED BY A DIODE LASER

[75] Inventor: Gunnar Wang, Rochester, N.Y.

[73] Assignee: Eastman Kodak Company, Rochester, N.Y.

[22] Filed: Dec. 3, 1973

[21] Appl. No.: 421,378

[52] U.S. Cl. .................. 331/94.5 L; 331/94.5 P
[51] Int. Cl. .................................. H01s 3/20
[58] Field of Search ........................ 331/94.5

[56] References Cited
UNITED STATES PATENTS

| | | | |
|---|---|---|---|
| 3,396,344 | 8/1968 | Broom | 331/94.5 D |
| 3,725,810 | 4/1974 | Ashkin et al. | 331/94.5 L |
| 3,740,665 | 6/1973 | Itzkan | 331/94.5 L |

*Primary Examiner*—William L. Sikes
*Attorney, Agent, or Firm*—D. I. Hague

[57] ABSTRACT

Apparatus for producing stimulated emission of radiation from a lasting medium comprising fluorescent organic dye molecules in solution. Lasing emission is achieved by directing the output of a diode laser along the transverse axis of a hollow optical resonator filled with a laser dye dissolved in a solvent. Using a commercially available pulsed GaAlAs diode laser and an infrared-absorbing and emitting cyanine dye in solution, laser wavelengths from 950 to 1,005 nanometers are obtained by changing the dye concentration of the dye solution. In a preferred embodiment, the resonator is a wave guide giving increased efficiency and the apparatus includes structure for tuning it to a variety of wavelengths.

17 Claims, 7 Drawing Figures

DYE LASER EXCITED BY A DIODE LASER

BACKGROUND OF THE INVENTION

The present invention relates to lasers and, more particularly, to a dye laser excited with a diode laser.

Dye lasers have received considerable attention in the art because of their unique capability to be spectrally tuned to any wavelength within a substantial portion of the dye's fluorescence band. A large number of laser dyes are available having fluorescence bands covering the spectral region from 350 nanometers to 1,200 nanometers. The dye laser has therefore received wide acclaim as being the first truly tunable laser capable of operating throughout the optical spectrum.

Laser action is achieved by exciting these laser dyes with radiation in the absorption band of the dyes. The absorption band of laser dyes varies from 340 nanometers to 1,000 nanometers but the most efficient laser dyes absorb and emit radiation in the visible portion of the spectrum, i.e., in the range from 400 nanometers to 700 nanometers.

Recently, the semiconductor industry has provided a compact lasing device known as a diode laser. A diode laser is a solid state semiconductor device having two regions of opposite conductivity type joined at a "p-n" junction plane. When the p-n junction is appropriately forward biased at an injected carrier current density sufficient to overcome the losses in the solid state environment, stimulated emission of radiation occurs upon the release of energy by carrier recombination. The light produced by stimulated emission travels in many different directions. However, due to the geometry of the junction, the optical modes which propagate parallel to the plane of the junction are favored, resulting in highly collimated radiation being emitted from the end surfaces of the junction.

Commercially available GaAlAs and GaAs diode lasers have outputs in the infrared portion of the spectrum, more specifically from approximately 770 nanometers to 900 nanometers. Other known diode lasers have outputs covering the spectral region from approximately 580 nanometers to beyond 1,200 nanometers.

SUMMARY OF THE INVENTION

Applicant has achieved laser action from an organic fluorescent dye using a diode laser as the excitation source. This achievement opens the door to a class of compact laser systems with emission over a broad spectrum range and with the capability of being tuned.

In accordance with the invention, the output beam of a diode laser is focused along the axis of an optical resonator filled with a laser dye dissolved in a solvent. The output beam of the diode laser, which is of a wavelength within the absorption band of the laser dye, is concentrated in the dye solution at a power density sufficient to produce the necessary number of excited dye molecules to achieve laser action.

In accordance with a preferred embodiment of the invention, the optical resonator is a wave guide providing total internal reflection of radiation striking its inner wall at or beyond the critical angle. The capability of tuning the resonator is provided by extending the length of the resonator so that a tuning element can be included.

According to another preferred embodiment of the invention, a plurality of dye laser excitation sources arranged in a linear array are focused along succeeding portions of the axis of the resonator or arranged radially around the axis of the resonator to increase the output power of the dye laser.

To successfully achieve laser action from an organic fluorescent dye using a diode laser as the excitation source, the applicant found himself faced with a variety of problems.

Laser dyes have short excited lifetimes and, therefore, need to be excited with radiation of high power density. Presently available diode lasers are, however, characterized by being (1) low power devices which (2) produce an output beam that (a) is line-shaped in cross section, that is to say the length of the beam is at least 20 times its width, (b) is difficult, in practice, to focus to a spot and (c) has high divergence. The use of a resonator into which the diode laser output in its elongated form if focused provided the necessary power density for laser emission.

As previously noted, the most efficient known laser dyes absorb and emit light in the visible portion of the optical spectrum while the output of the most efficient known diode lasers is in the infrared portion of the optical spectrum. Attempts have been made to find laser dyes which are very efficient absorbers in the infrared portion of the spectrum i.e., from 700 nanometers to 1,350 nanometers.

Recently Messrs. J. P. Webb and B. E. Plourde, in a study undertaken for the Night Vision Laboratory U.S. Army Electronics Command; Contract No. DAAKO2-72C-0012 AD 748863, reported some infrared laser dyes that were more efficient in that region than previously known laser dyes. These laser dyes, however, were found to be unstable when exposed to ambient light. When exposed to the ordinary dye laser excitation source, e.g., a flash lamp, these unstable laser dyes require a bulky dye circulation system, a large dye volume and, when small resonators are used, frequent cleaning.

According to a preferred embodiment of the invention, when these dyes are subjected to diode laser emission in the apparatus of this invention, such instability does not inhibit lasing until substantial use has been obtained. In fact, without circulation of the dye through an optical wave guide, as much as sixty hours of use are obtained.

The operation and various advantages of the invention will become more apparent by referring to the accompanying drawings and to the detailed description of the preferred embodiments which follow:

BRIEF DESCRIPTION OF THE DRAWINGS

In the detailed description of the preferred embodiments of the invention presented below, reference is made to the accompanying drawings wherein corresponding parts are identified by like numerals and in which.

DESCRIPTION OF THE PREFERRED EMBODIMENTS

Figure 1:
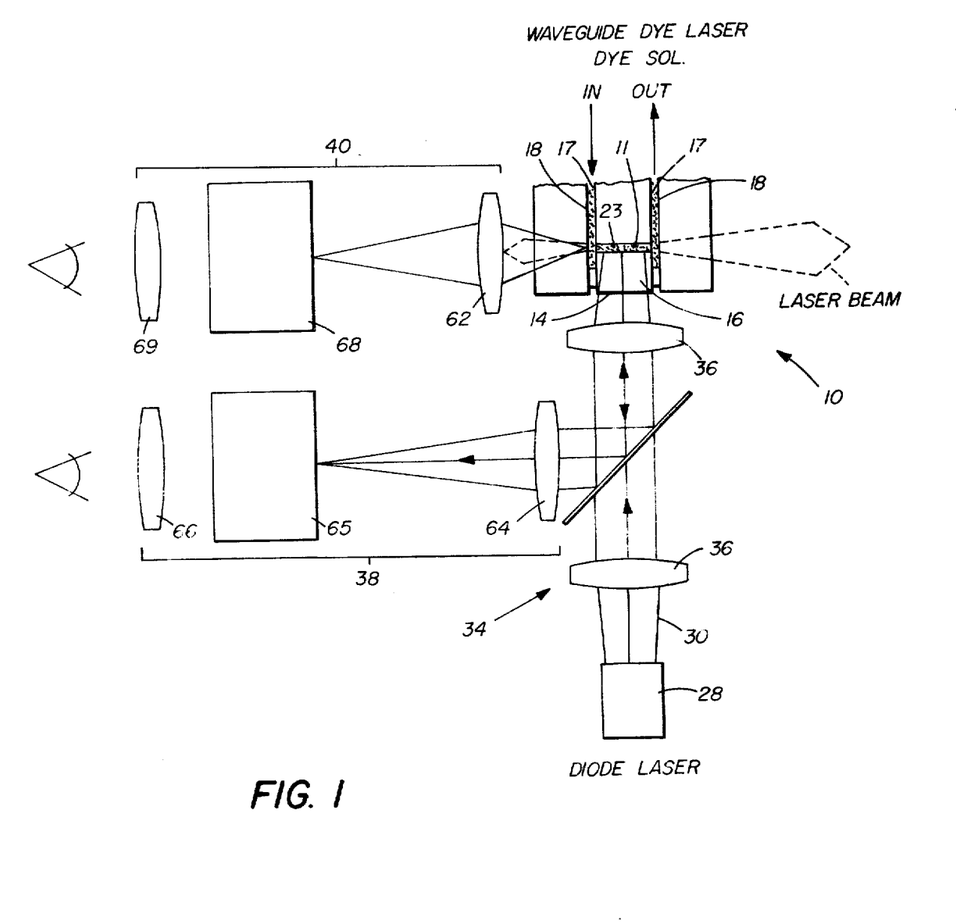
FIG. 1 is a schematic diagram of a dye laser system in accordance with a preferred embodiment of the invention.
Figure 2:
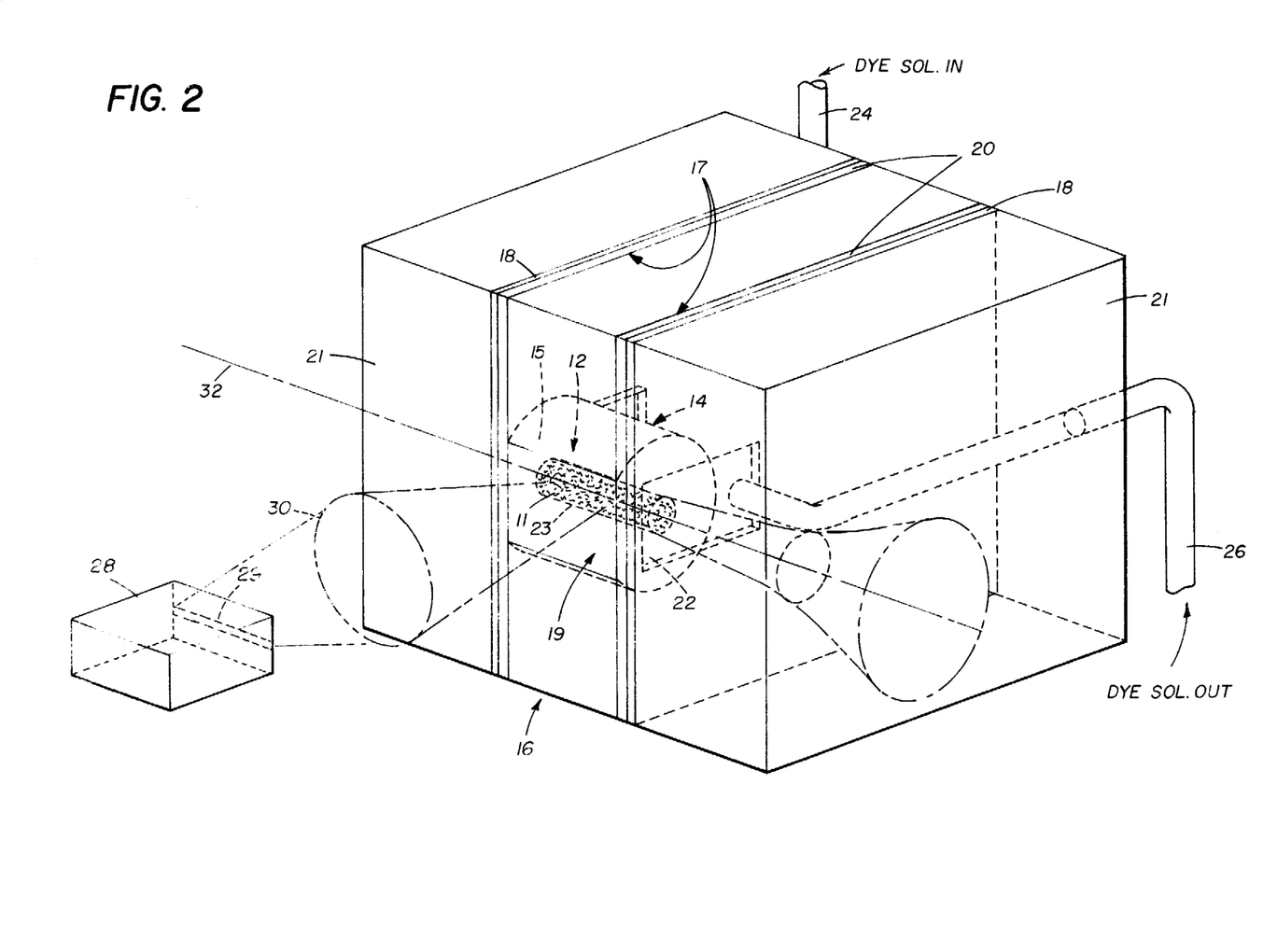
FIG. 2 is an enlarged prespective view of an optical wave guide similar to that shown in FIG. 1.

Referring now to the drawings and in particular to FIGS. 1 and 2, the dye laser 10 of the present invention comprises a diode laser 28 excitation source and a cavity or optical resonator 12 containing a laser dye solution 11. The resonator 12 consists of a wave guide 15 with plane mirrors 18 positioned at each end of the wave guide normal to the axis 32 of the wave guide.

The details of the wave guide 15 are best seen in FIG. 2. The wave guide 15 is made from a plane parallel plate 16 of fused quartz having plane parallel surfaces 17 and containing a hole 14 approximately normal to the parallel surfaces. A fused quartz capillary tube having a bore 23 of appropriate diameter and length is glued into the hole 14 to form the wave guide 15. The two plane parallel surfaces 17 and the surface 19 formed partially of plate 16 and partially of the capillary tube are polished to optical quality.

A pair of mirrors 18 is formed by vacuum deposition of a dielectric mirror coating having the proper reflectance within the fluorescence band of the laser dye solution 11 onto two substrates 21 polished to optical quality. To utilize the dye laser emissions generated in the resonator 12, one or both of the mirrors 18 transmits a portion of the radiation within the fluorescence band of the dye solution.

To provide the means to fill the capillary bore 23 with the laser dye solution 11, as well as to provide the capability of circulating the dye solution through the capillary bore 23, a spacing of 6 micrometers between the ends of the wave guide 15 and the mirrors 18 is provided by depositing a coating of silicon oxide or other spacing material on each mirror 18 with an open area 22 as shown. Since optical losses increase with increasing distance between the wave guide 15 and the mirrors 18, the 6 micrometer spacing was chosen as being large enough to allow the dye solution to flow through the capillary bore 23 and yet small enough to hold the optical losses at a minimum.

The plate 16 is then pressed between the two mirror substrates 21 in a mechanical mounting (not shown) so that the mirror surfaces 18 are normal to the axis 32 of the wave guide 15. No additional sealing between the plate 16 and the mirrors 18 is necessary.

The wave guide 15 is filled with the laser dye solution 11, through an inlet duct 24 and an outlet duct 26 which are coupled to open areas 22 located at each end of the wave guide. Circulation of the dye solution 11, if desired, can be provided by coupling the inlet and outlet ducts to a pump (not shown).

Diode laser 28 emits a line-shaped excitation beam 30 emanating from a line-shaped emitting area 29 of the diode laser 28. Beam 30 is focused along the axis 32 of the capillary bore 23 by a lens system 34 consisting of two microscope objectives 36 having a numerical aperature of 0.5. The numerical aperature of a lens is equal to the radius of the lens divided by the square root of the sum of the squares of the focal length of the lens and the radius of the lens. This arrangement permits collection of substantially all of the output light from the diode laser 28. The magnification of the lens system 34 is one. The position of the diode laser 28 is then adjusted so that the excitation beam 30 is absorbed into the dye solution 11 at a power density sufficient to produce a critical population inversion. Proper alignment is accomplished by rotating the diode laser 28 around the axis of the excitation beam 30 until a maximum portion of the laser dye solution 11 fluoresces. Fluorescence from the dye in the transverse direction is observed with an infrared viewer 38 consisting of an objective 64, an image converter tube 65 and an eyepiece 66. Fluorescence in the longitudinal direction from the end of the wave guide 15 is observed with an infrared microscope 40 consisting of a microscope objective 62, an image converter tube 68 and an eyepiece 69. Observation of the intensity of this fluorescence is used to determine the best location of the cavity 12. The onset of lasing is indicated by the appearance of a mode pattern viewed through the infrared microscope 40 whose size increases as the microscope 40 is retracted but whose shape remains constant.

As in other lasers, in the first step of the laser process, the dye molecules of the laser dye solution 11 are excited from the electronic ground state to vibrational-rotational energy levels of the first excited singlet state by absorbing radiation emanating from the excitation source 28. The second step of the laser process occurs as the molecules in the excited singlet state return to the ground state, such transition including radiative transitions in which photons are emitted, as well as radiationless transitions in which thermal energy is released. Radiation due to the spontaneous emission of excited singlet state dye molecules is radiated in all directions. The light radiated along the axis 32 of the cavity 12 is guided by the walls of the cavity to mirrors 18 positioned at each end of the cavity 12 and reflected by the mirrors 18 back through the cavity. Light propagating back and forth between the mirrors 18 will be attenuated because of losses due to the transmission of the mirrors, scattering in the dye solution, and imperfections in the construction of the laser. Another source of losses is the absorption of light by the dye molecules in the ground state. Therefore, before laser oscillations can be obtained, the number of the dye molecules in the excited singlet state which amplify the radiation by stimulated emission must reach a certain value, commonly referred to as the "critical population inversion". When a critical population inversion is achieved, the single pass gain of the radiation propagating between the mirrors 18 is at least equal to the losses of the complete laser system. To assist in the overcoming of these losses, a wave guide providing total internal reflection of radiation striking its inner walls at or beyond the critical angle was choosen. As a result of total internal reflection, reflected radiation passes back into the dye, rather than escaping, to provide low optical losses for the resonator 12.

An optical wave guide with total internal reflection provides the following benefits to the apparatus of the present invention. First, the length of the capillary bore 23 can be made to match the length of the diode laser 28 while the bore diameter can be chosen independently so that the desired average excitation power density is obtained. The width of the light emitting area of commercially available diode lasers is typically 2 micrometers while the length varies from approximately 0.1 to 1 millimeter. Second, with total internal reflection of the laser light inside the filled capillary bore 23, the resonator modes have the necessary low loss in spite of possible mirror misalignment and optical inhomogeneities caused by thermal gradients in the solution. And third, a wave guide is easily manufactured in short lengths to match the length of the light emitting area 29 of the diode laser 28. When short excitation pulses from the diode laser 28, for example in the range of 5 nanoseconds, are used to obtain correspondingly short laser output pulses, a short resonator is desirable to assist in providing a short build-up time for the laser pulses.

The dye can be selected from a wide variety of laser dyes having an absorption band covering the wavelength output of the diode laser 28. Representative useful dyes include those described in Webster U.S. application Ser. Nos. 295,773 and 295,774 both filed Oct. 6, 1973, and, respectively entitled "Bridged Cyanine Dye Lasers" and "Cyanine Dye Infrared Lasers". Both of these Webster applications are incorporated herein by reference. A particularly useful dye is the infrared absorbing dye 5,5'-dichloro-11-diphenylamino-3,3'diethyl-10,12-ethylene-thiatricarbocyanine perchlorate. The fluorescent dye is dissolved in an appropriate solvent. With regard to the solvent per se, it advantageously comprises a solvent which does not adversely affect the lasing properties of the dye and whose index of refraction is higher than that of the material forming the inside surfaces of the wave guide 15. When the solvent has a higher index of refraction than the wave guide material, the wave guide 15 has total internal reflection as to radiation striking it at or beyond the critical angle. Particularly useful solvents are tetramethylene sulfoxide (TMSO) and dimethyl sulfoxide (DMSO). The refractive index for TMSO is $N_D = 1.520$ (20°C and for DMSO $N_D = 1.478$ (20°C). The refractive index of the fused quartz capillary tube 15 is $N_D = 1.458$ (18°C).

Figure 3:
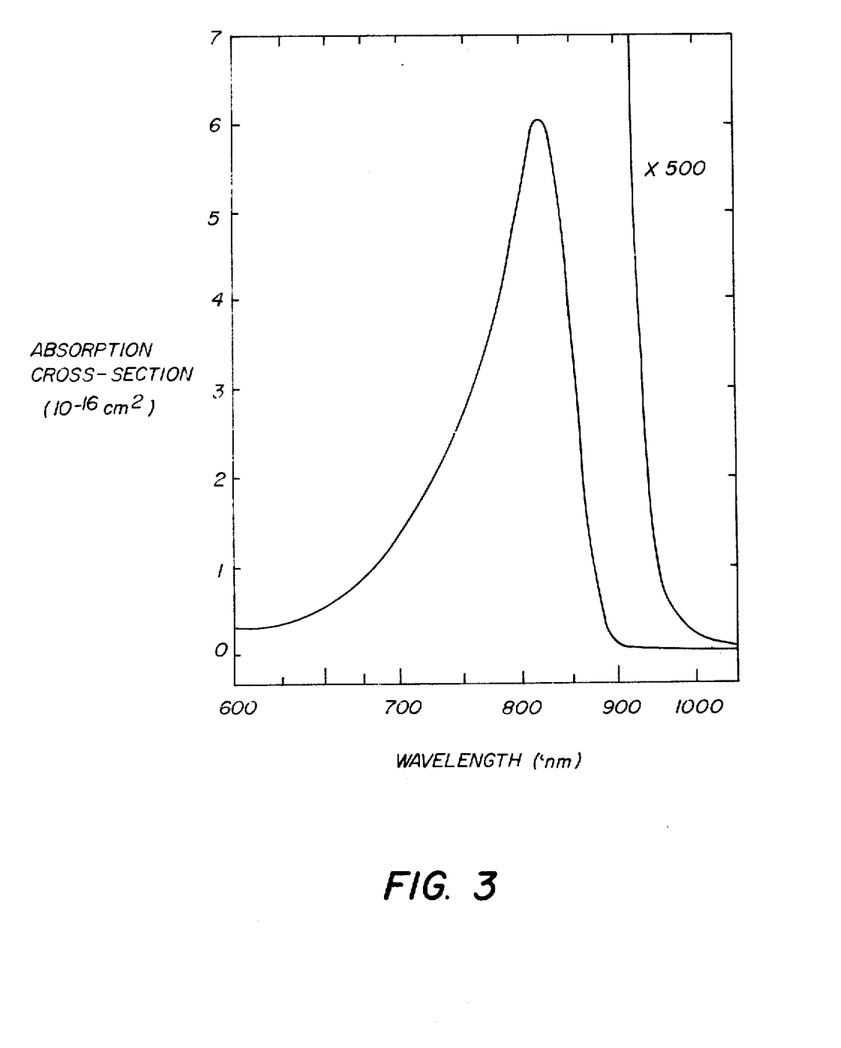
FIG. 3 is a graph showing the absorption spectrum of a lasing medium useful in the apparatus of the present invention.

The absorption cross section of the aforementioned cyanine dye dissolved in TMSO as a function of wavelength is shown in FIG. 3. The ordinate of the graph is the absorption cross section of the dye in units of $10^{-16}$ $cm^2$. The abscissa of the graph shows wavelength in nanometers. The line in the right-hand portion of the graph shows the absorption cross section of the dye at 500 magnifiaction. The peak absorption of this dye solution is approximately 825 nanometers. This peak absorption closely matches the 820 nanometer output of a gallium aluminum arsenide (GaAlAs) diode laser.

The invention is further illustrated by the following example:

EXAMPLE 1

A dye laser 10 was prepared according to the construction shown in FIGS. 1 and 2. The plane parallel surfaces 17 of the plate were measured to be parallel within 0.5 mrad (milliradians) while the angle between the axis of the capillary bore 23 and the normal to the plane parallel surfaces 17 varied from 10 to 30 mrad for different plates 16 which were used in the example. The capillary bore 23 had a diameter of 30 micrometers and a length of 1 millimeter.

The diode laser 28 was a type LA69 GaAlAs heterostructure diode laser manufactured by Laser Diode Laboratories, Inc. The diode laser 28 was pulsed at a rate of 200 Hertz and operated at room temperature. The resulting output wavelength of the diode laser 28 was 820 nanometers with a peak output power of approximately 20 watts. The full width at half maximum of the light pulses was typically 60 nanoseconds. The length of the emitting area of the diode beam was 0.6 millimeters, approximately 60 percent of the length of the capillary bore 23, and the width of the beam was approximately 2 micrometers.

Figure 4:
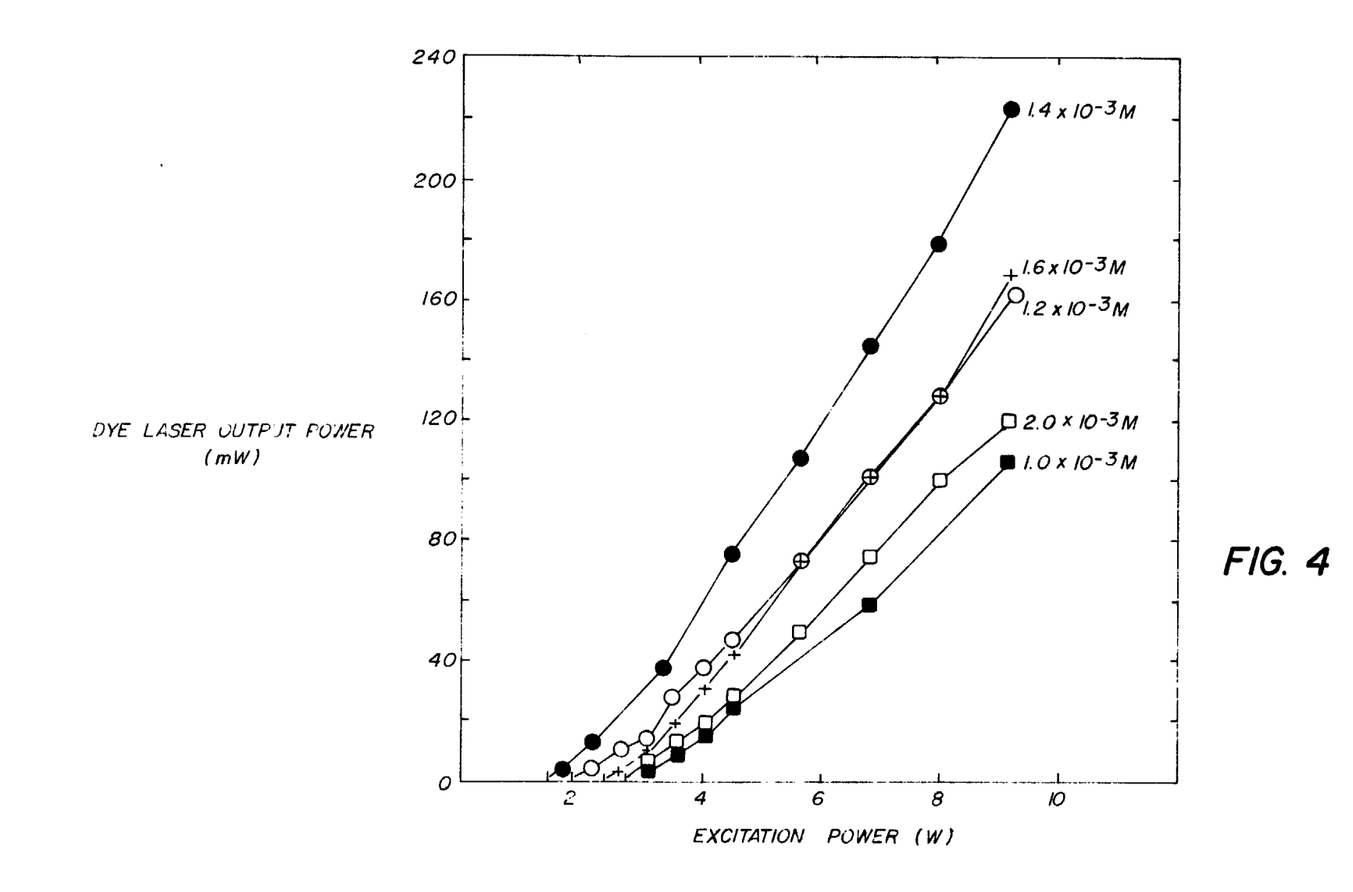
FIG. 4 is a graph showing the output power of the laser of FIG. 1 as a function of the excitation power for five different lasing dye concentrations.

Lasing was observed with the laser dye 5,5'-dichloro-11-diphenylamino-3,3'-diethyl-10,12-ethylenethiatricarbocyanine perchlorate dissolved in TMSO at dye concentrations of $1.0 \times 10^{-3}$; $1.2 \times 10^{-3}$; $1.4 \times 10^{-3}$; $1.6 \times 10^{-3}$ and $2.0 \times 10^{-3}$ mole per liter of solution. In FIG. 4 the output power of the laser 10 using the aforementioned dye solutions is shown as a function of the power of the excitation beam 30 from the GaAlAs diode laser 28. As noted previously, the output power of the laser 10 varies according to the positioning of the wave guide 15 in the focus of the excitation beam 30. For each dye concentration, several series of measurements were made with the position of the wave guide 15 readjusted between each series. The series gave somewhat different results; at 9 watts excitation power the maximum deviation from the average output power was 10–15 percent. The results shown in FIG. 4 show the highest output power obtained for each dye concentration. In the examples shown in FIG. 4, the peak output power of the laser beam shifted from shorter to longer wavelengths with increasing dye concentration. This is typical for untuned dye lasers. Using a monochromator having a 2 nanometer resolution, the wavelength of the peak output power was measured to be 955 and 995 nanometers with dye concentrations of $1.0 \times 10^{-3}$ and $2.0 \times 10^{-3}$ mole per liter, respectively. With the dye concentration providing the highest output power, $1.4 \times 10^{-3}$ mole per liter, the wavelength was measured to be 985 nanometers. The band width of the laser radiation increased from 20 to 40 nanometers with increasing dye concentration. The transmission of the mirrors 18 with the dielectric coating in contact with the TMSO solvent was 4 percent at 950 nanometers and increased to 7.5 percent at 1,000 nanometers.

Referring to the graph of FIG. 4, it can be seen that the threshold excitation power for lasing is approximately 2.8 watts using a dye concentration of $1.0 \times 10^{-3}$ mole per liter. The threshold power decreases to 1.9 watts using a dye concentration of $1.2 \times 10^{-3}$ M and reaches a low of 1.5 watts using a dye concentration of $1.4 \times 10^{-3}$ M. The threshold power then increases to 2.4 watts with a dye concentration of $1.6 \times 10^{-3}$ M and to 2.8 watts with a dye concentration of $2.0 \times 10^{-3}$ M. The peak output power from the dye laser 10 follows a similar course, i.e., rising from 106 milliwatts using a dye concentration of $1.0 \times 10^{-3}$ M to 162 milliwatts with a dye concentration of $1.2 \times 10^{-3}$ M and to a high of 224 milliwatts with a dye concentration of $1.4 \times 10^{-3}$ M and then falling to 162 milliwatts and 120 milliwatts using dye concentrations at $1.6 \times 10^{-3}$ M and $2.0 \times 10^{-3}$ M, respectively. From these results it can be seen that the optimum dye concentration for the particular illustrated cyanine laser dye in a 30 micrometer diameter dye cavity is $1.4 \times 10^{-3}$ mole per liter. Other laser dyes which can be substituted for the illustrated cyanine laser dye may have different optimum dye concentrations. Furthermore, the dye concentration giving the highest output power varies according to the size of the dye cavity. The optimum bore diameter and dye concentration is determined for each laser dye and excitation diode laser used. Generally speaking, however, up to certain limits, as the diameter of the dye cavity is reduced, the dye concentration of the laser dye is increased to obtain optimum lasing conditions.

With the preferred cyanine laser dye, the laser 10 can be operated for several hours without active circulation with almost no change in output power. In a test using a diode laser operating at a 200 Hertz pulse rate and a 7 watt pump power, the dye laser output power is gradually reduced to half the initial value after 60 hours of operation. Circulation of the laser dye solution can be provided to increase the stability of the laser output and is desirable when other less stable laser dyes are used.

Figure 5:
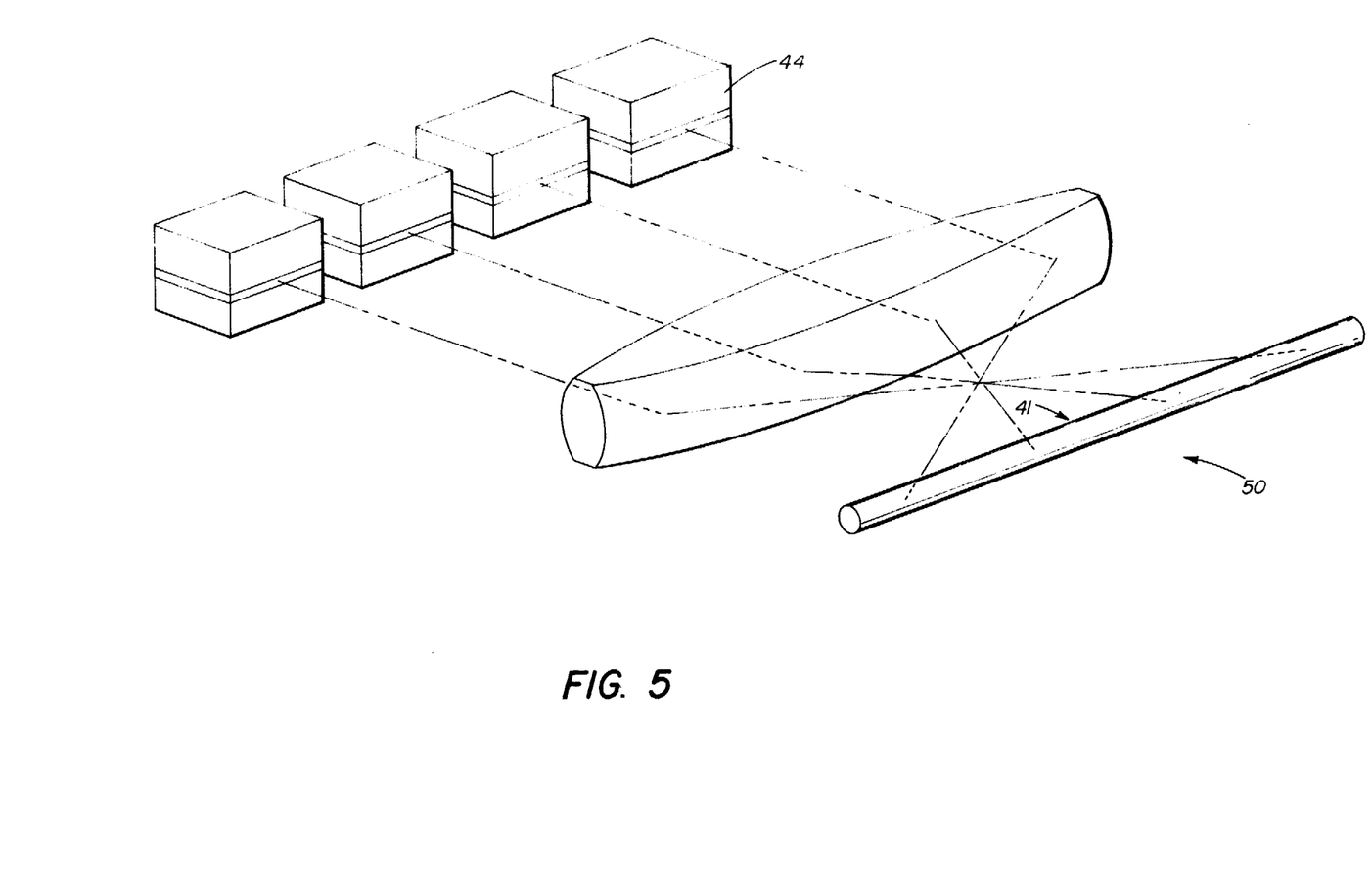
FIG. 5 is a diagrammatic illustration of a dye laser system in accordance with another preferred embodiment of the invention which utilizes a plurality of diode laser excitation sources.

Another embodiment of the invention is shown schematically in FIG. 5. Higher output power from the laser 50 is obtained by exciting a wave guide 41 two millimeters long having an inner diameter of approximately 30 micrometers with a linear diode laser array 44, type LA215 manufactured by Laser Diode Laboratories, Inc. The array 44 is 156 mils (3.8 mm) long and consists of 12 individual diode lasers. With an excitation power of approximately 15 watts entering the wave guide 41 from the diode laser array 44, the output power from the laser 50 is approximately 0.7 watt. A higher output power can also be obtained by simultaneously exciting the wave guide 41 from different directions or by reducing the capillary bore diameter.

Figure 6A:
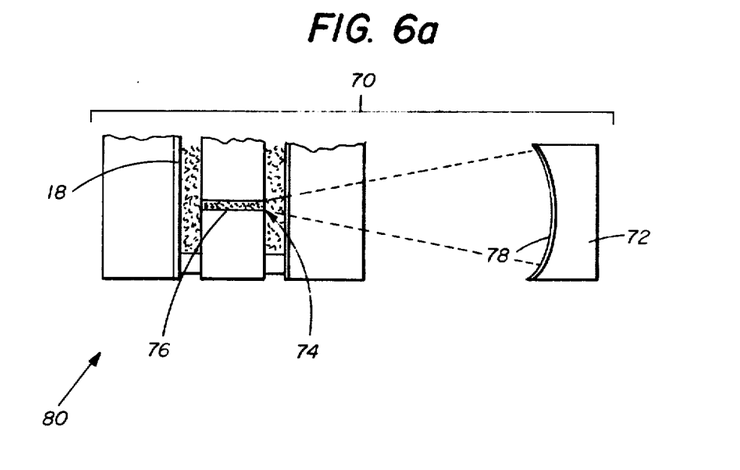
FIG. 6a is a schematic diagram of a dye laser system which demonstrates the tuning capability of a diode laser excited dye laser.

A dye laser system in accordance with another preferred embodiment of the invention is shown in FIG. 6a. In this embodiment, a laser 80 is as described above except that the length of the optical resonator 70 is increased to include a spherical mirror 72. The center of curvature of this spherical mirror 72 is adjusted so that it coincides with an end 74 of the capillary bore 76 of the resonator 70. Using a mirror coating 78, the mirror 72 reflects the laser light back upon itself along the axis of the resonator 70. Inclusion of the spherical mirror 72 in the resonator 70 demonstrates that its length can be extended so that the resonator can accommodate a tuning mechanism. In the particular embodiment shown in FIG. 6a, the radius of curvature of the mirror 72 is 6.4 millimeters, the diameter of the bore 76 is 20 micrometers and its length is 1 millimeter.

Figure 6B:
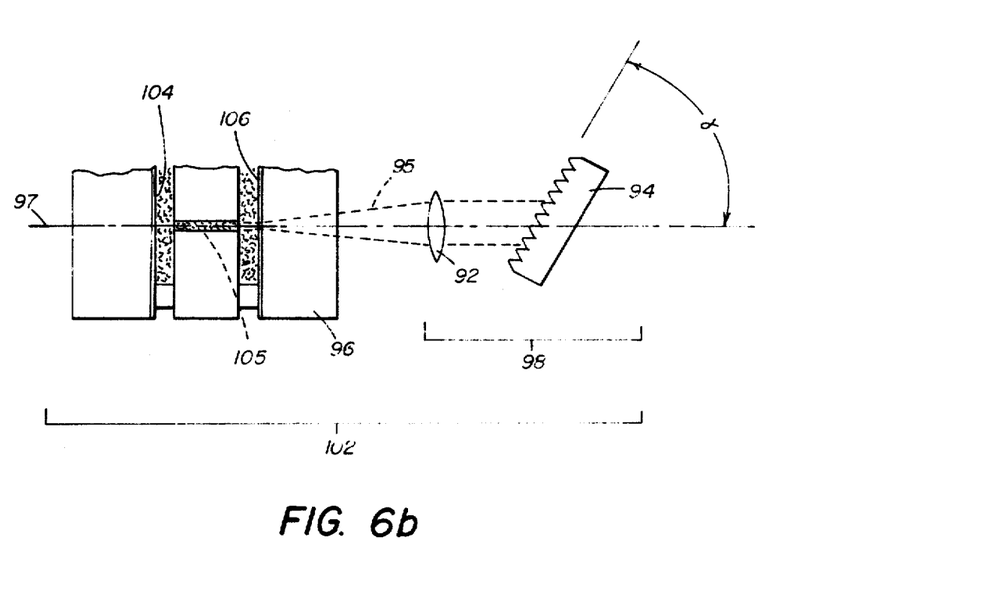
FIG. 6b is a schematic diagram of a tunable dye laser in accordance with the teachings of the present invention.

A tunable dye laser apparatus using the principles shown in FIG. 6a is illustrated in FIG. 6b. A tuning device 98 includes a collimating lens 92 and a dispersive element 94. It is an approximate optical equivalent to the spherical mirror 72 in the FIG. 6a embodiment. The dispersive element 94 is illustrated as a diffraction grating but also may be one or a set of tilted etalons, prisms, tilted birefringent plates, etc., combined with a plane mirror. The substrate 96 may or may not have a mirror coating. When no mirror coating is used, the laser wavelengths are completely determined by the dispersive element 94 of the tuning attachment 98. Using a partially transmitting, broad band mirror coating on the substrate 96, the resulting mirror 106 and tuning attachment 98 act together as a reflector which, within the narrow wavelength region determined by the dispersive element 94, will have a higher reflectivity than the mirror 106 alone. This arrangement is particularly advantageous when dispersive elements with relatively high losses, for example, diffraction gratings are used. Because the laser light in the optical resonator 102 propagating between the mirrors 106 and 104 is only partially transmitted by the mirror 106, the loss due to the dispersive element 94 is reduced.

In the arrangement shown, the substrate 96 is provided with a mirror coating having a 33 percent transmittance in air within the wavelength region from 950 to 1,000 nanometers. The transmittance in air for the mirror 104 is 2 percent within this wavelength region. The length of the capillary bore 105 is 2 millimeters and the bore diameter is 27 micrometers. The focal length of the lens 92 is 4.6 millimeters. The dispersive element 94, which in this example is a diffraction grating has 830.8 grooves per millimeter and a blaze angle of 20° 34'. The efficiency of the grating 94 at 900 nanometers is 78 percent. The optical length of the resonator 102 is 15 millimeters.

The operation of this embodiment of the invention is further illustrated by the following example:

EXAMPLE II

The laser dye 5,5'-dichloro-11-diphenylamino-3,3'-diethyl 10, 12-ethylenethiacarbocyanine perchlorate is dissolved in tetramethylene sulfoxide (TMSO) at a concentration of $14 \times 10^{-3}$ mole per liter of solution. The excitation source (not shown) is a diode laser array, type LA215 manufactured by Laser Diode Laboratories, Inc. The diode laser array is 156 mils (3.8 mm) long and consists of 12 individual diode lasers. The excitation beams emanating from the diode laser array are focused at the capillary bore 105 by two f/1.0 Kodak projection lenses (not shown) with a focal length of 22 millimeters.

The angular orientation of the grating 94 relative to the axis 97 of the resonator 102 was adjusted so that maximum total output power was obtained. The output spectrum was then measured with a nonochromator. The wavelength of the peak intensity was 961 nanometers and the band width of the radiation was less than 6 nanometers. The angle $\alpha$ of the dispersive element 94 with respect to axis 97 was then changed 12.7 mrad. The wavelength of the peak intensity was then measured to be 989 nanometers. Again, the band width of the radiation was less than 6 nanometers. By changing the angle $\alpha$ a total of approximately 28 mrad, the laser can be tuned continuously over a band width ranging from 932 nanometers to 992 nanometers.

The diode laser excited dye laser disclosed herein has been found to provide laser oscillations in lower order transverse modes. As is well known in the art, a laser beam propagating in the lower order transverse modes can be advantageously employed in a variety of applications. Propagation of a laser beam in the lower order transverse modes is particularly advantageous in communications applications.

Another advantage of the dye laser of the present invention is that short excitation pulses of a rapidly pulsed diode laser can be used to provide a laser beam with correspondingly short output pulses. Output pulses of short duration are useful in spectroscopy, communications, etc.

Still another advantage of the present invention is that the excitation of the dye laser with the diode laser provides a dye laser apparatus that is more efficient in terms of electricial drive input power versus optical output power than prior art dye lasers. A further advantage of the dye laser apparatus of the present invention is that it can be readily adapted to use other dyes and diode lasers as they become available to the marketplace. Commercially available GaAlAs and GaAs diode lasers provide outputs covering the spectral region from 0.77 to 0.9 micrometers and potentially useful laser dyes cover the spectral region from 0.35 to 1.2 micrometers. For each particular laser dye chosen, a diode laser having an emission wavelength within the absorption band of the dye should be used. Also, the mirrors 18 must have the proper reflectance within the fluorescence band of the dye where lasing is obtained. Further, the dimensions of the capillary bore 14 should be chosen so that the optimum conditions for lasing are obtained.

The invention has been described in detail with reference to preferred embodiments thereof, but it will be understood that variations and modifications can be effected within the spirit and scope of the invention. For example, a more compact laser system without a focusing lens can be made by mounting the diode laser 28 close to the plate 16. In this case, the capillary bore 23 must be positioned close to the surface of the plate 16 (on the order of 50–100 micrometers) so that most of the pump light in the divergent pump 30 is absorbed by the dye. Alternatively, the pump beam 30 from the diode laser 28 can be couppled to the wave guide 15 by a bundle of optical fibers.

I claim:
1. A laser comprising:
   a. semi-conductor means having a junction between N and P type materials which stimulates emission of radiation when electrical current passes therethrough to produce laser radiation;
   b. an active liquid medium comprising fluorescent organic dye molecules dissolved in a solvent, said dye molecules having an absorption band at least partially overlapping the emission radiation spectrum of said semi-conductor means;
   c. a dye cavity;
   d. means for positioning at least a portion of said liquid medium in said cavity;
   e. means for directing the laser radiation of said semi-conductor means into said liquid medium in said cavity at a power density sufficient to excite a sufficient number of dye molecules to produce a critical population inversion in which radiation is spontaneously emitted and amplified by the excited dye molecules; and
   f. means for redirecting a sufficient percentage of the amplified radiation emitted by the excited dye molecules back through said dye cavity to produce laser radiation therein.

2. The laser defined in claim 1 wherein said semiconductor means comprises a linear array of a plurality of diode lasers.

3. The laser defined in claim 1 wherein said active liquid medium comprises an infrared absorbing dye dissolved in a solvent.

4. A laser comprising:
   a. semi-conductor means having a junction between N and P type materials which stimulates emission of laser radiation when electrical current pases therethrough;
   b. an active liquid medium comprising fluorescent organic dye molecules dissolved in a solvent, said dye molecules having an absorption band at least partially overlapping the emission spectrum of said semi-conductor means;
   c. a resonator comprising a hollow, optical wave guide filled with said liquid medium and a pair of mirrors, one mirror being positioned at each end of said wave guide; and
   d. means for concentrating the laser radiation of said semi-conductor means within said liquid medium at a power density sufficient to excite a sufficient number of the dye molecules to produce a critical population inversion, said mirrors being designed to redirect a sufficient percentage of the amplified radiation emitted by the excited dye molecules back through said wave guide to produce laser oscillations therein.

5. The laser defined in claim 4 wherein the refractive index of the solvent is higher than the refractive index of said wave guide.

6. The laser defined in claim 4 wherein said wave guide is cylindrically shaped and said mirrors are plane mirrors positioned approximately normal to the axis of said wave guide.

7. The laser defined in claim 6 wherein the diameter of said wave guide ranges from 18 to 30 micrometers.

8. The laser defined in claim 6 wherein said means for concentrating comprises means for focusing the output of said excitation source along the axis of said wave guide.

9. The laser defined in claim 4 wherein said dye molecules are capable of fluorescing over a continuum of wavelengths, said laser further comprising a tuning means comprising a collimating lens and dispersive element which forces the laser to oscillate at a single or a few of such wavelengths.

10. A laser comprising:
    a. a cavity comprising a plate having a cylindrical capillary bore enclosed therein and two plane parallel mirrors positioned adjacent the ends of said bore and normal to the axis of said bore;
    b. an active liquid medium positioned in said capillary bore, said medium comprising infrared absorbing fluorscent, organic dye molecules dissolved in a solvent;
    c. a diode laser having an output at least a portion of which is of a wavelength absorbed by said dye molecules; and
    d. means for concentrating the output of said diode laser absorbed by said dye molecules along the axis of said bore at a power density sufficient to excite a sufficient number of said dye molecules to produce a critical population inversion in which infrared radiation is spontaneously emitted and amplified by the excited dye molecules, said two plane parallel mirrors reflecting a sufficient percentage of the amplified radiation emitted by the excited dye molecules back through said bore to produce laser oscillations therein.

11. The laser defined in claim 10 wherein said infrared absorbing dye molecules comprises 5,5'-dichloro-11-diphenyl-amino-3,3'-diethyl-10,12-ethylenethiatricarbocyanine perchlorate.

12. The laser defined in claim 10 wherein said plate is made of polished plane parallel fused quartz and said capillary bore has a diameter of 18 to 30 micrometers.

13. The laser defined in claim 11 wherein the solvent comprises tetramethylene sulfoxide.

14. The laser defined in claim 11 wherein the solvent comprises dimethyl sulfoxide.

15. The laser defined in claim 11 wherein the dye concentration of said liquid medium ranges from 1.0 to $10^{-3}$ to $2.0 \times 10^{-3}$ mole per liter of liquid medium.

16. The laser defined in claim 10 wherein said diode laser comprises a GaAlAs diode laser.

17. A dye laser comprising:
 a. a source of excitation comprising at least one diode laser;
 b. an active liquid medium comprising fluorescent organic dye molecules dissolved in a solvent, said dye molecules having an absorption band covering the wavelength of the output of said source of excitation;
 c. a resonator comprising a hollow optical wave guide filled with said active medium, said wave guide comprising a cylindrical capillary bore formed of a material having an index of refraction which is lower than the index of refraction of said solvent;
 d. two plane mirrors, one mirror being positioned adjacent each end of the capillary bore substantially perpendicular to the axis of said bore, said mirrors being spaced from the ends of said bore so as to define an inlet duct and an outlet duct, respectively;
 e. means connecting to said inlet and said outlet ducts for circulating said liquid medium through said bore; and
 f. means for concentrating the output of said source of excitation along the axis of said bore at a power density sufficient to excite a sufficient number of said dye molecules to produce a critical population inversion in which infrared radiation is spontaneously emitted and amplified by the excited dye molecules, said mirrors reflecting a sufficient percentage of such amplified radiation back through said bore to produce laser oscillation therein, one of said mirrors having sufficient transmittance to permit passage of the laser radiation from said dye cavity for utilization.

* * * * *